United States Patent
Asberg et al.

[11] 3,758,180
[45] Sept. 11, 1973

[54] CAGE FOR ROLLING BODIES IN A DOUBLE-ROW ROLLING BEARING

[75] Inventors: Sture Lennart Asberg, Savedalen; Erik Edvin Eriksson, Goteborg, both of Sweden

[73] Assignee: SKF Industrial Trading and Development Company, Amsterdam, Netherlands

[22] Filed: Aug. 27, 1971

[21] Appl. No.: 175,654

[30] Foreign Application Priority Data

Aug. 27, 1970 Sweden.................... 11621/70

[52] U.S. Cl. ................................. 308/201
[51] Int. Cl. ............................. F16c 33/46
[58] Field of Search ................... 308/201, 217

[56] References Cited
UNITED STATES PATENTS
1,613,058  1/1927  Souer et al .................... 308/201

FOREIGN PATENTS OR APPLICATIONS
262,399   10/1926  Great Britain ................ 308/201
1,198,221  6/1959  France ........................ 308/201

*Primary Examiner*—Manuel A. Antonakas
*Assistant Examiner*—Frank Susko
*Attorney*—Howson and Howson

[57] ABSTRACT

A cage for rolling elements of a double row rolling bearing comprising a circumferentially-extending annular member, a plurality of generally parallel fingers projecting axially from said annular member and circumferentially spaced apart to define a plurality of pockets for the rolling elements, each of said pockets including a means for spacing the rolling elements in side-by-side relation to form the two rows of rolling elements, each of said fingers being spaced apart adjacent the terminal ends remote from said annular member and being formed adjacent to the terminal ends thereof to retain the rolling elements in side-by-side relation, said fingers being resilient so that the cage may be assembled axially relative to the rolling elements.

3 Claims, 5 Drawing Figures

PATENTED SEP 11 1973 3,758,180
FIG. 1.
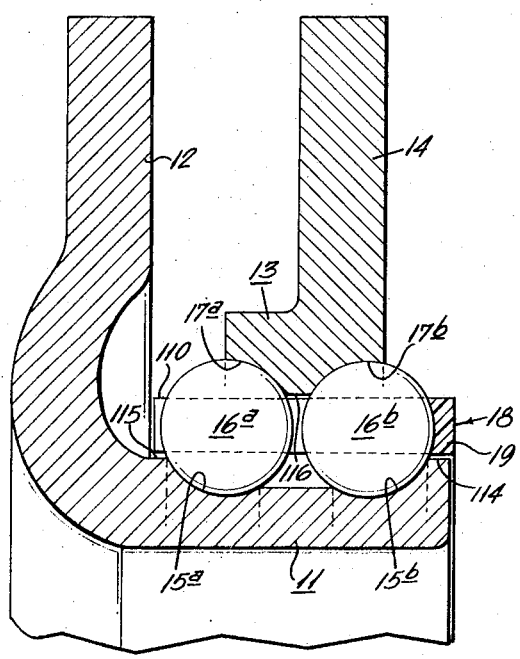
FIG. 2.
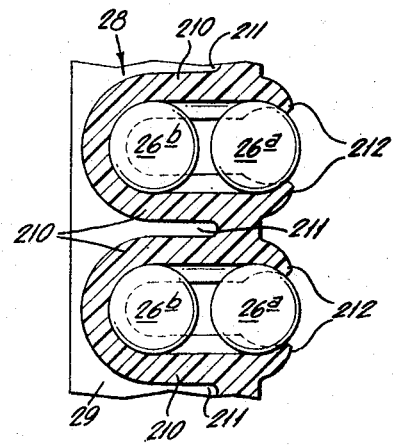
FIG. 3ᵃ
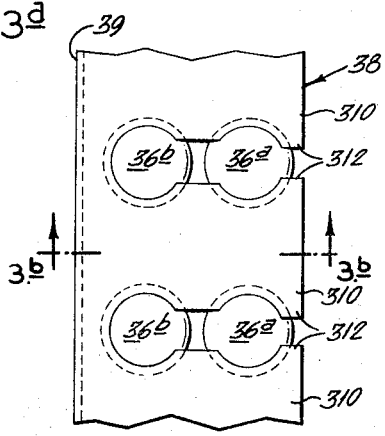
FIG. 4.
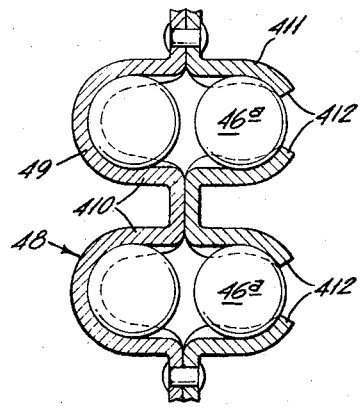
FIG. 3ᵇ
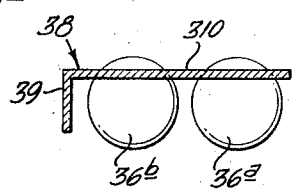

CAGE FOR ROLLING BODIES IN A DOUBLE-ROW ROLLING BEARING

The present invention relates to a cage for rolling bodies in a double row rolling bearing, preferably of the type being mounted by eccentric replacement of the race rings of the bearing, whereby the cage, which is common for both rows of rolling bodies, is inserted axially from one side of the bearing.

The invention is suitable especially for double row angular contact ball bearings, where due to the design of the bearing only one side is accessible for the insertion of the cage.

The present cage differs from previous cages by the features that the cage comprises a ring-shaped side part and fingers axially projecting from this part, which fingers are in principle parallel to each other and which separate the rolling bodies two by two with one rolling body from each row of rolling bodies in each pair.

In order to describe the invention, in the following some representative embodiments are shown in connection to the accompanying drawing, in which FIG. 1 shows a section of a bearing of a type for which a cage according to the inventon is especially suitable. FIGS. 2, 3 and 4 show constructive variations of the cage according to FIG. 1. In the FIGS., 11 indicates a bearing race ring provided with an outwardly directed flange 12. The outer ring 13 of the bearing is also provided with a flange part 14. In the inner ring two races 15a and 15b are provided in which run balls 16a and 16b which also contact the races 17a and 17b, provided in the outer ring 13. The balls are separated by the cage 18 which is made of a ring-shaped side part 19 an a number of fingers 110 projecting from this side part, which fingers are parallel to each other. The fingers reach over the two raceways 15a and 15b, thereby separating the balls two by two, with one ball from each row in each pair.

The bearing according to FIG. 1 has an inner ring provided with a flange 12, which makes an arrangement with separate cages, i.e., one for each row of balls, very complicated, not to say impossible, from the mounting point of view.

The mounting of a cage according to FIG. 1 is carried out in such a way that the race rings are placed eccentrically and the balls are put in place in the sickle-shaped portion between the race rings. When these have been placed concen-trically and the balls have been separated, the fingers of the cage are axially inserted between the balls, which are arranged two by two. A certain mounting force is needed to overcome the mounting resistance which is always provided by a cage of this so-called snap-type.

The fingers 110 of the cage are concave on those surfaces which are facing the balls so that the cage thereby is carried and centered by the balls. It is also possible to let the fingers be supported against supporting surfaces which can be arranged on the inner ring or on the outer ring. These surfaces on the inner ring can preferably be shoulders 114,115. On the outer ring it can be the shoulder 116 situated between the races 17a and 17b.

FIG. 2 shows a part of cage 28 which is made of a ring-shaped side part 29 and fingers 210 projecting from this part, which fingers separate balls 26a and 26b two by two. The fingers are provided with cavities 211 and two nose-shaped parts 212, which partly surround the balls 26a and make the distance between the "fingertips" smaller than the ball diameter. This means that when the cage is mounted the nose-shaped parts 212 on one and the same finger have to be pressed against each other and be elastically deformed so much that the cage can be inserted, first between the balls 26b and then between the balls 26a, to the position shown in FIG. 2. In the fingers 210 the surfaces facing the balls are concave with the same or slightly greater radius than these balls, whereby the cage will be carried and centered by the balls.

Cages of the described type are called snap cages. They are preferably made of amid of acetal plastics or the like. FIGS. 3a and 3b show a snap cage 38 of a type which slightly differs from the previously shown types and is made of sheet metal. From a ring-shaped part 39 a number of fingers 310 are projecting, which fingers have the same purpose as the fingers 110 and 210 in the FIGS. 1 and 2. The fingers 310 are provided with noses 312 at their free ends, which noses are intended to fix the cage in the right axial position in the bearing. At the mounting of the cage the fingers 310 are springing radially so much that the noses 312 can pass the balls 36a and 36b. Even this type of cage is ball centered.

The cage 48 according to FIG. 4 is hardly differing in function from the type shown in FIG. 2. The ring-shaped side part 49 is here designed so that it constitutes a part of the ball separating fingers 410. The remaining part of the fingers are constituted by pressed sheet metal parts 411 which comprise nose-shaped parts 412, which partly surround the balls 46a and give the described snapping effect. The sheet metal parts 411 are e.g. riveted or welded to the side part 49.

A cage according to the invention can be produced in a number of ways and be made of different materials such as reinforced or un-reinforced plastics, sheet metal or massive metal or combinations of plastics, sheet metal or metal.

The invention is not limited to rolling body centered cages, but cages centered on the inner or outer race ring are of course also included.

We claim:

1. A cage for the rolling elements of a double-row rolling bearing comprising a circumferentially extending annular member, a purality of generally parallel fingers projecting axially from said annular member and circumferentially spaced apart to define a plurality of pockets for the rolling elements, each of said pockets including means for spacing the rolling elements in side-by-side relation to form the two rows of rolling elements, each of said fingers being spaced apart adjacent the terminal ends remote from said annular member and being formed adjacent the terminal ends thereof to retain the rolling elements in side-by-side relation, said fingers being resilient so that the cage may be assembled axially relative to said rolling elements, the portion of said fingers confronting said rolling elements being concave so that the cage is carried and centered by the rolling elements.

2. A cage according to claim 1, characterized thereby that the fingers partly surround the rolling elements, thereby centering the cage.

3. A cage according to claim 1, characterized thereby that the distance between the free ends of the fingers are diminished by projections, abutments or like which are elastically compressed or deformed during the mounting of the cage.

* * * * *